United States Patent [19]
Lake

[11] 3,735,738
[45] May 29, 1973

[54] WALL MOUNTABLE AQUARIUM

[76] Inventor: John K. Lake, 15353 Weddington St., Van Nuys, Calif. 91401

[22] Filed: Aug. 4, 1971

[21] Appl. No.: 168,860

Related U.S. Application Data

[63] Continuation-in-part of Ser. No. 88,002, Nov. 9, 1970, abandoned.

[52] U.S. Cl. .................................................119/5
[51] Int. Cl. ...........................................A01k 64/00
[58] Field of Search ....................119/5; 240/2 LC

[56] References Cited

UNITED STATES PATENTS

| | | |
|---|---|---|
| 2,595,085 | 4/1952 | Kuriyama ............................119/5 |
| 1,974,068 | 9/1934 | Greensaft ............................119/5 |
| 3,651,975 | 3/1972 | Callan ............................119/5 X |
| 2,144,551 | 1/1939 | Skolnick ............................119/5 |

Primary Examiner—Hugh R. Chamblee
Attorney—Mahoney, Hornbaker & Schick

[57] ABSTRACT

A picture frame-like, novelty aquarium adapted to contain the usual aquarium life-support systems and still be capable of easy mounting on a wall or the like surface in a manner that insures proper securement thereof. An easily fabricated, economical, aquarium of unique, aesthetic quality capable of flush, picture-like mounting on a wall or other surface and in an exemplary embodiment of molded plastic.

16 Claims, 7 Drawing Figures

PATENTED MAY 29 1973                3,735,738

INVENTOR.
JOHN K. LAKE
BY MAHONEY, HORNBAKER
AND SCHICK
ATTORNEYS

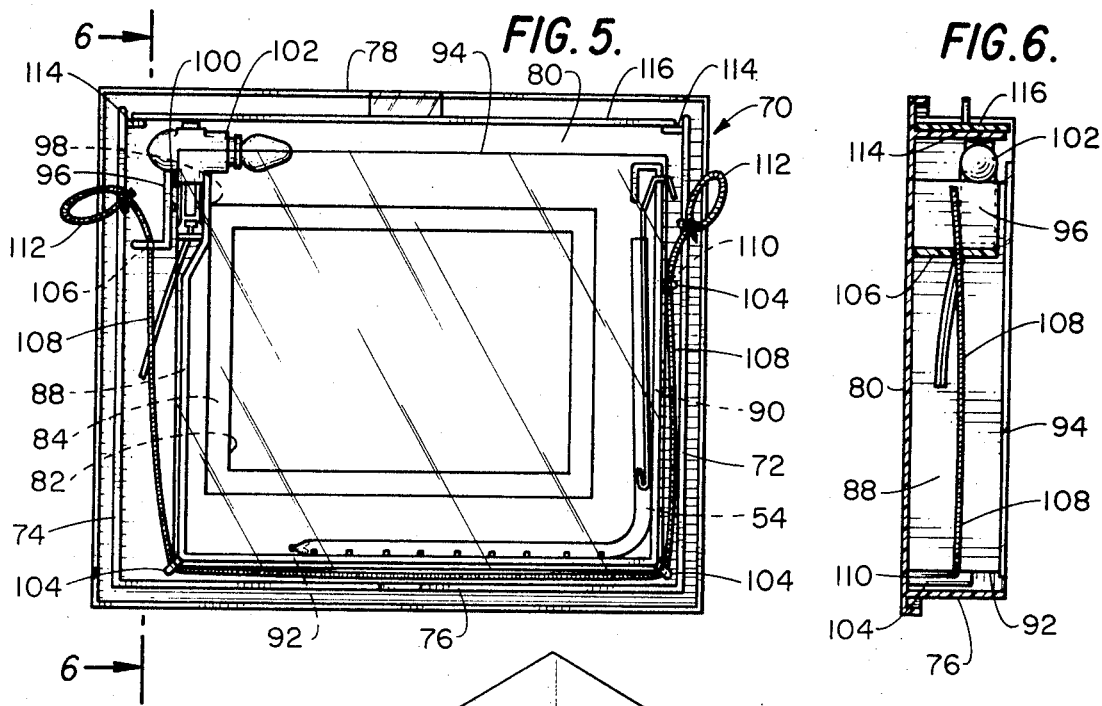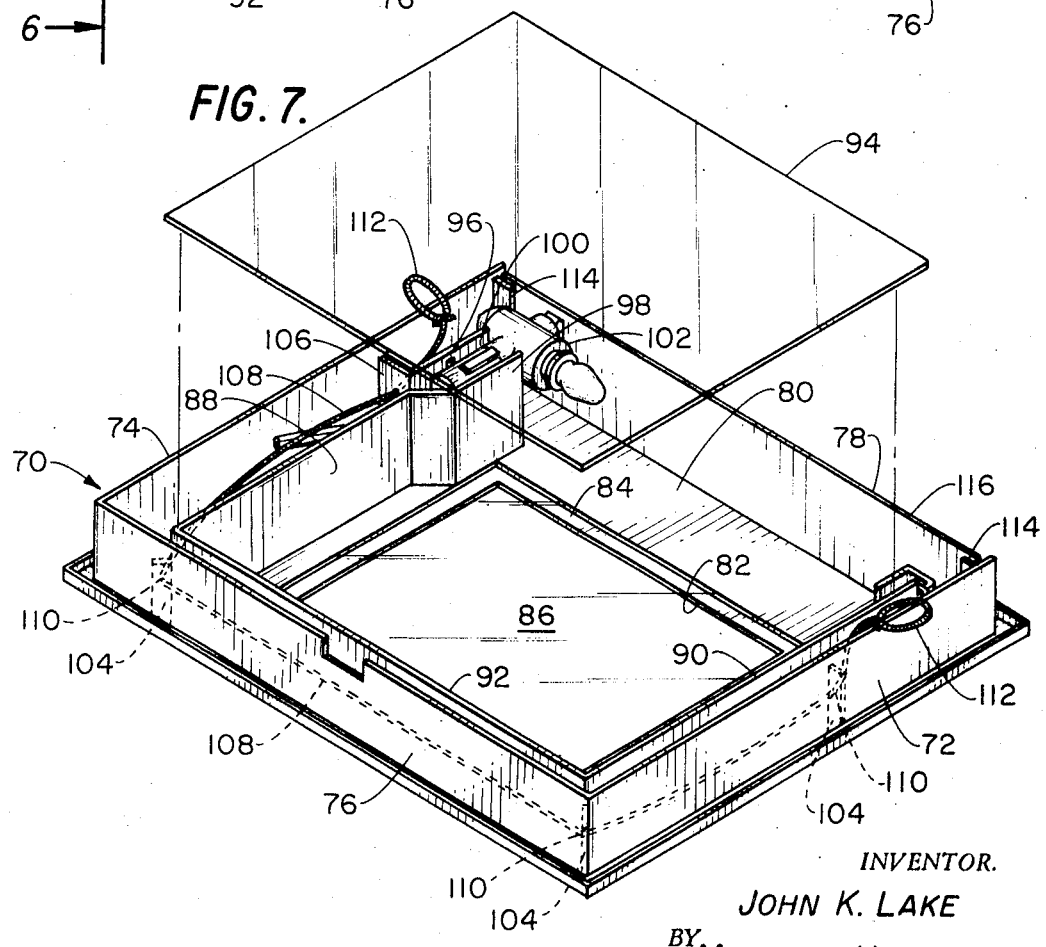

WALL MOUNTABLE AQUARIUM

CROSS-REFERENCE TO RELATED APPLICATION

This application is a continuation-in-part of application Ser. No. 88,002, filed Nov. 9, 1970, now abandoned.

BACKGROUND OF THE INVENTION

As is well known, aquaria and the like structures, used for housing fish or other members of the aquatic family, have usually involved large cumbersome structures requiring much attention and care and the utilization of relatively large floor or table-top areas. Oftentimes, the tank structures are so large as to create a definite weight problem when considering the weight of gravel provided on the bottom of the tank and the weight of the water held by the tank. These weight limitations have generally militated against the use of wall mounted aquaria or fish tanks or alternatively, have necessarily dictated complicated supported structures in order to bear up under the weight factors involved.

The herein disclosed invention is specifically directed to aesthetic, ornate wall mountable aquaria of the type that take up little room yet add a unique decor and many fun-filled hours of enjoyment obtained through watching aquatic life contained within the aquarium. Thus, this invention is particularly directed to small or miniaturized picture-like aquariums which may be mounted on a wall in secure fashion, assured that the total weight of the structure will be adequately supported.

OBJECTS AND SUMMARY OF THE INVENTION

It is an object of this invention to provide a wall mounted aquarium structure.

It is another object of this invention to provide an aesthetic aquarium member which may be easily mounted on a wall surface or the like.

It is still another important object of this invention to provide a wall mounted aquarium structure which is provided with mounting means to insure stable, yet adjustable securement thereof on a mounting surface such as a wall.

It is still a further important object of this invention to provide an aquarium structure of simplified construction which is economical to produce and which may be secured in a safe manner on a wall surface.

It is still a more specific object of this invention to provide a wall mounted aquarium member of picture frame-like character wherein frame, tank member and life support systems therefor are combined and supported in a manner which is safe and which insures that water contained in the tank member is not splashed thereout of onto the wall upon which the structure is mounted.

It is still another object of the invention to provide a wall mounted aquarium having a molded plastic housing member which in conjunction with sheets of, for example, glass provides a fluid-tight container or water tank.

Other objects and advantages of the invention will be apparent from the following specification and the accompanying drawings which are for the purpose of illustration only.

Basically, in one embodiment, the invention is directed to a wall-mounted aquarium comprising a frame member defining a housing having a picture frame aperture; an open topped, at least transparent front, tank member supported within said housing so that said at least transparent front is framed within said aperture and secured to said frame member; and support means secured to said tank member to support said aquarium on a wall or the like. In another embodiment an integrally moulded, plastic housing member in conjunction with sheet members provide the basic components of the aquarium.

BRIEF DESCRIPTION OF THE DRAWINGS

FIG. 5 is a back view of another embodiment of the invention;

FIG. 6 is a view taken along the line 6—6 of FIG. 5; and

FIG. 7 is a perspective view of the embodiment shown in FIG. 5 with one of the glass sheets shown in the exploded position.

DESCRIPTION OF THE BEST EMBODIMENT CONTEMPLATED

Figure 1:
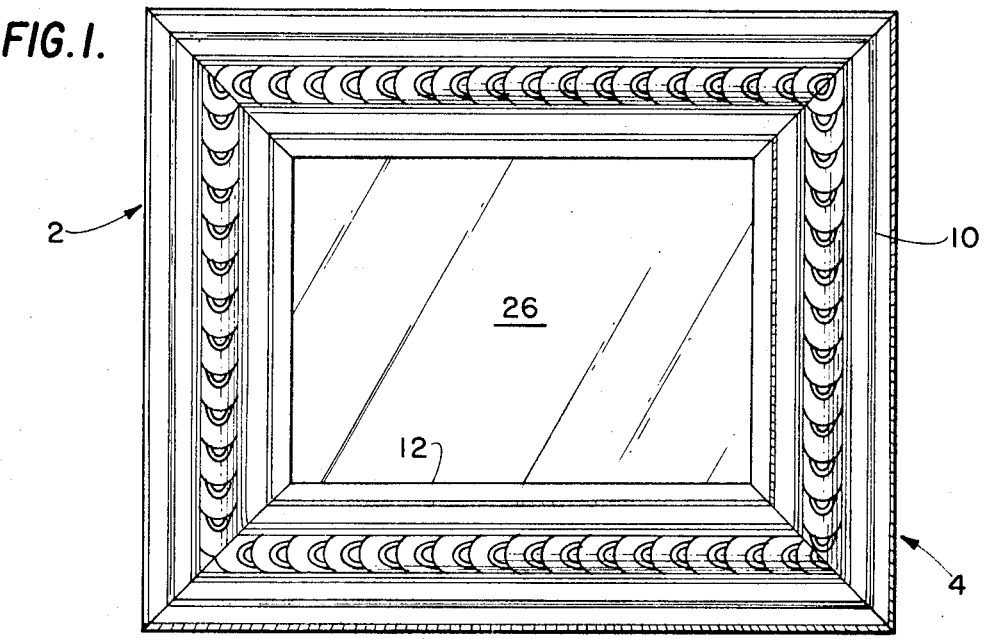
FIG. 1 is a front view of a wall mounted aquarium in accordance with the teachings of this invention.

Referring to the drawings wherein like numerals of reference designate like elements throughout, an exemplary wall mountable aquarium 2, in accordance with one aspect of this invention, comprises a frame member 4 having side walls 6 and bottom wall or side walls 8 with front side walls 10, in this instance, having an ornate design much like a picture frame and having a central picture frame-like aperture 12. Sidewalls 6 and bottom wall 8 may be secured to each other and front panel 10 as by means of gluing where the materials of construction are wood and in the preferred form wood because of its relative light weight, is utilized in the structure.

It will be noted that frame member 4 defines essentially an open backed chamber 14 having the top thereof enclosed by a movable cover panel 16 supported by lateral support strips 18 glued or otherwise secured to the interior surface of panels 6. So that cover 16 may be easily removed, brass loop 20 is provided on the upper surface of cover 16. The interiorly directed surface 22 of cover 16 may be provided with a reflective surface such as white paint or aluminum foil for purposes which will become apparent.

Secured within the chamber 14 defined by frame member 4 is aquarium tank or member 24 having at least one transparent face or side such as 26 and secured to the interior surface of front panel 10 along the entire periphery as by means of silicone rubber cement, adhesive or other means such that tank 24 and frame member 4 are secured to one another in relatively rigid relationship. It will be noted that tank member 24 is of rectangular shape and in this instance, is fabricated of transparent glass or plastic sheets and is somewhat thin in width so as to be fully received within the confines of chamber 14 defined by frame member 4.

Aquarium tank 24 comprises a bottom glass sheet 28, side sheets 30, front sheet 26 as earlier indicated, and back sheet 32, all secured to one another by an appropriate adhesive so that watertight seams are formed along mating edges. The aquarium tank member 24, of course, has an open top 36 access to which is easily obtained by removal of cover 16. It will be noted that the dimensions of tank 24 are such as to provide a lateral space on either side to accommodate the usual life support systems of an aquarium such as, for instance, the usual heater means 38 supported on the end wall 30 of tank 24 in conventional fashion, the lateral side spacing providing a throughway for cord 40 of heater 38. Also, this lateral spacing provides a path for convectively driven air to cool the tank 24 from the heat of the light 50 as will be seen. The lid or cover 16 is narrower than the space in the frame top to allow the heated air to escape upwards. A rectangular hole (not shown) in the bottom wall 8 allows the cool ambient air to enter.

Secured to the sidewall 30 of tank 24 opposite heater 38 is an electrical outlet 42 secured by means of glue, adhesive or the like, the lateral side space again leaving a throughway for cord 44 which like cord 40, may be connected into a suitable electrical outlet. Positioned in plug 42 is light unit 46 with the usual thumb switch 48 for energizing light bulb 50 supported over the open top 36 of tank 24.

So as to prevent splashing of water contained within the aquarium (so as not to soil the wall on which the aquarium 2 is supported), a splash shield 52 is cemented or otherwise secured to the back sheet 32 making up tank member 24. Splash shield 52 is of appropriate size to extend almost the entire length of tank 24, the body portion of heater 38 in itself providing a shield and is of sufficient depth or height to extend almost to the interior surface 22 of cover 16. Thus, the likelihood of fish contained within tank 24 splashing water out of the opening 36 onto the wall upon which the aquarium 2 is mounted is fairly remote. An aerator bubbler 54 of conventional type may also be provided within the tank 24.

So as to adequately support the aquarium structure 2 in accordance with the weight of the water to be contained within tank 24 and considering that considerable damage would be incurred should the aquarium 2 not be supported in adequate fashion, spaced support means 56 are provided around the closed circumference of tank member 24. For an aquarium structure such as that pictured herein having a 16 × ;4 inches size and a 2 inches width, three such support structures 56 are adequate. Support structures 56 are secured to the exterior surfaces of the sheet members making up tank member 24 as by means of elastomer adhesive 58 of globular shape to encompass a major portion of the reinforcing bead or stringer 60 through which a length of wire 62 is threaded, the extreme ends thereof 64 terminating in loops by which means the aquarium 2 may be hung on wall hooks or the like provided for that purpose.

Figures 2, 3:
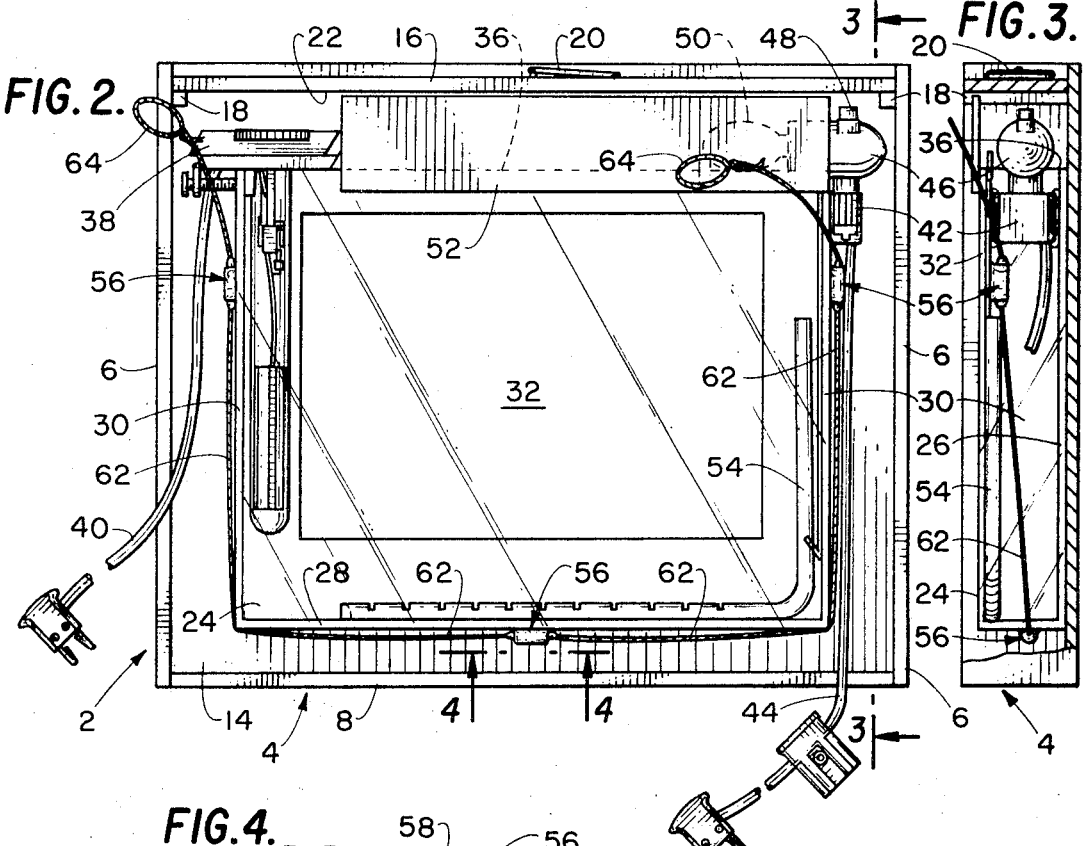
FIG. 2 is a back view of the structure shown in FIG. 1.
FIG. 3 is a side view partially fragmented taken along the lines 3—3 of FIG. 2.
Figure 4:
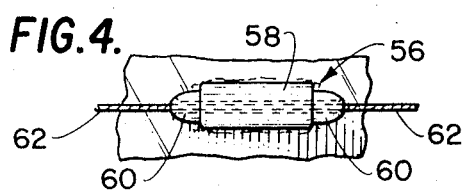
FIG. 4 is an enlarged view of one of the support structures used in supporting one of the wall mounted aquariums of this invention and being taken along the line 4—4 of FIG. 2.

It will be noted that wire 62 runs along a majority of the side surfaces of sheets 30 and all of the outside surface of bottom sheet 28 making up tank member 24. The wire 62 provides all of the support for the wall mountable aquarium 2 in an efficient, secure manner in a sense independent of frame member 4 which as earlier noted, is adhesively secured to tank member 24. To insure adequate center of gravity support, the support members 56 are positioned above the center of gravity of the water-filled aquarium 2 as shown in FIG. 2.

Guides or beads 60 not only insure that the wire 62 will be appropriately retained in position along tank 24, but prevent undue stress point formation which would conceivably cause metal fatigue or wear of the wire strands making up wire 62. The support means 56 on the end walls of tank 24 are spaced closer to the back panel 32 whereas the bottom support member 56 is spaced approximately equidistant between front panel 26 and back panel 32, making up tank member 24 for purposes of stability of support when the aquarium 2 is mounted on suitable hangers secured in a wall or the like. The continuous wire 62 through the beads 60 also allows a slight rotation of the tank 24 with respect to the hanging hooks or nails, enabling leveling of the tank 24 in the event the hanging nails are not precisely the same height.

Thus there is provided a simple, reliable, appropriately strong, yet adjustable hanging means.

Referring now to the remaining figures of the drawing, the embodiment of the invention utilizing a moulded plastic housing member 70 of unique design is illustrated. Housing member 70 comprises a first set of side walls 72 and 74 and a first bottom wall 76 and a top wall 78 which in conjunction with an apertured front wall 80 defines a picture frame-like structure. The surface of front wall 80 (not shown) may be scalloped or have a carved-like configuration to simulate a wood carved picture frame as in FIG. 1. The inside surface of wall 80 around the aperture 82 is recessed in perimetric fashion as at 84 so as to receive the first sheet of transparent glass 86 in fluid tight relationship. To ensure rigid securement of glass plate 86, a transparent elastomeric water insoluble glue may be used.

The housing member thus far described is integrally fashioned of any one of the conventionally used mouldable plastics and is provided with a second inner set side wall 88 spaced inwardly from side wall 74; side wall 90 similarly spaced from side wall 72 and additionally, bottom wall 92 inwardly spaced from bottom wall 76.

The second inner set side and bottom walls are integrally moulded with housing member 70 although they could comprise separate elements which are secured to housing member 70 as by means of plastic adhesives or means well known in the art.

It will be noted that the second inner set walls 88, 90 and 92 form a planar surface upon which to receive a second sheet 94, in this instance also of transparent glass. To insure fluid-tight securement of sheet 94 with the upper surfaces of the inner set second walls, a layer of water insoluble plastic cement may be placed at the inter-face formed by the glass sheet 94 and the edge surfaces of the inner set second wall members. It will be noted that sheet members 94 and 86 in conjunction with the second inner set wall members form the tank structure or a fluid holding means within which to hold water or the like in fluid-tight relationship.

A second wall member 96 is positioned adjacent an upper portion 98 of second sidewall 88 so as to form therebetween a light supporting space 100 in which the light 102 may be frictionally held.

Integrally moulded tabs or support projections 104 are disposed from the side walls of the second inner set wall portions and form, in conjunction with a similar integral tab or support 106 attached to light support wall 96, a means in association with a length of wire 108 of support for housing member 70.

The support tabs 104 and 106 are provided with apertures therethrough as, for example, 110 through which the length of wire 108 is strung and it will be seen that this wire extends substantially the entire bottom surface length and a majority of the side wall length of housing member 70. The length of wire is formed with end loops 112 by which means the housing member 70 may be supported from a wall or the like in a manner previously disclosed for the other embodiments of the invention.

Lateral projections 114 from the inner set side walls form a support for cover 116 as disclosed in the earlier embodiment. It will be obvious that the instantly described embodiment being essentially of integrally moulded plastic, is more easily fabricated than the earlier described embodiment and the placement of the two sheets of glass (which could be plastic if so desired) forms a tank or liquid holding member which is essentially integral with the remainder of the structure. The means of supporting the integral structure is also simplified and it will be noted that the weight of the assemblage is distributed throughout the length of the wire support. While transparent glass has been disclosed, it is apparent that other sheets of glass or indeed of other materials, may be used when and where desired.

Thus, wall mountable aquaria have been disclosed that are simple in design, economical to manufacture and fabricate, and which are supported in the manner which will insure against possible accidents and still providing all of the essentials necessary for aquaria which provide many hours of viewing pleasure.

I claim:

1. In a wall-mountable aquarium, the combination of: a frame member defining a housing having a picture frame aperture; an open top, at least transparent front, tank member supported within said housing so that said at least transparent front is framed within said aperture, said tank member being secured to said frame member; a plurality of spaced support means secured to said tank member to support said aquarium on a wall or the like, and said frame member having an exterior, ornate, picture frame-like surface and said plurality of support means comprises guide members secured to the exterior of said tank member having a support wire threaded therethrough.

2. The aquarium in accordance with claim 1 wherein said tank member is of rectangular configuration and is fashioned of glass sheets secured to one another by adhesive insoluble in and inert to water.

3. The aquarium in accordance with claim 1 wherein said tank member is of rectangular configuration having a cross-sectional width less than said frame member and is fabricated of glass material.

4. The aquarium in accordance with claim 3 wherein said frame member has side, bottom and front walls thereby defining a housing of congruent but larger size than said tank member.

5. The aquarium in accordance with claim 4 which includes a removably mounted cover member supported on said sidewalls over the top of said tank member.

6. The aquarium in accordance with claim 5 wherein said support wire engages a majority of the side and bottom exterior walls of said tank member.

7. The aquarium in accordance with claim 6 wherein a splash shield is positioned on the back wall of said tank member to prevent splashing of water from said aquarium onto an adjacent wall when said aquarium is mounted on a wall.

8. The aquarium in accordance with claim 7 wherein three guide members are provided one on each of the side and bottom walls of said tank member and are secured thereto as by means of adhesive and are bead-like, elongate in configuration to reduce frictional stresses on said wire passing therethrough.

9. The aquarium in accordance with claim 8 wherein said guide members are made of glass material having a central bore through which said wire is threaded.

10. In a wall-mountable aquarium, the combination of: a housing member having a side and bottom walls and an apertured front wall defining a picture frame-like configuration; associated fluid-holding means within said housing member to hold fluid therein in fluid-tight relationship, and associated supporting means extending adjacently on at least three sides of said fluid holding means for supporting said aquarium on a wall or the like, said supporting means comprising a length of wire extending along the bottom and adjacent sides of said fluid-holding means, and being fixedly secured at spaced points along each of said bottom and adjacent sides of said fluid-holding means and having two opposite free ends of said length of wire formed into loops.

11. In a wall-mountable aquarium, the combination of: a housing member having first side and bottom walls and an apertured front wall defining a picture frame-like configuration; second inner set side and bottom walls spaced inwardly from said first side and bottom walls defining a planar surface to receive an enclosing sheet member; a first sheet member secured to said apertured front wall in fluid-tight relationship; a second sheet member secured to said inner set side and bottom walls defining said planar surface in fluid-tight relationship thereby forming a fluid enclosure; and associated supporting means for supporting said aquarium on a wall or the like.

12. The aquarium of claim 11 wherein the perimeter of the inside surface of said apertured front wall is recessed to receive said first sheet member.

13. The aquarium of claim 12 wherein said second side and bottom walls are integral with said housing member.

14. The aquarium of claim 13 wherein said supporting means comprise integral projections from said housing member adjacent said second inner set side and bottom walls with an associated length of wire, said length of wire extending at least substantially along said second bottom wall.

15. The aquarium of claim 14 which additionally includes a support wall spaced from an upward portion of one of said inner set second side wall and forming a light support therewith, said support being integral with said housing member.

16. The aquarium of claim 15 wherein at least said first sheet is of transparent glass and said housing member is fabricated of moulded plastic.

* * * * *